United States Patent
Said et al.

(10) Patent No.: US 10,939,115 B2
(45) Date of Patent: Mar. 2, 2021

(54) EFFICIENT WEIGHTED PROBABILITY ESTIMATION FOR BINARY ARITHMETIC CODING

(71) Applicant: QUALCOMM Incorporated, San Diego, CA (US)

(72) Inventors: Amir Said, San Diego, CA (US); Hilmi Enes Egilmez, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/444,952

(22) Filed: Jun. 18, 2019

(65) Prior Publication Data
US 2019/0387232 A1 Dec. 19, 2019

Related U.S. Application Data

(60) Provisional application No. 62/687,136, filed on Jun. 19, 2018.

(51) Int. Cl.
*H04N 19/13* (2014.01)
*H04N 19/18* (2014.01)
(Continued)

(52) U.S. Cl.
CPC ........... *H04N 19/13* (2014.11); *H04N 19/176* (2014.11); *H04N 19/18* (2014.11); *H04N 19/70* (2014.11)

(58) Field of Classification Search
CPC ...... H04N 19/13; H04N 19/18; H04N 19/176; H04N 19/70; H04N 19/42; H04N 19/91
See application file for complete search history.

(56) References Cited

U.S. PATENT DOCUMENTS

| 2014/0140400 A1* | 5/2014 | George | H04N 19/184 |
| | | | 375/240.12 |
| 2014/0177708 A1* | 6/2014 | Alshin | H04N 19/96 |
| | | | 375/240.12 |

(Continued)

OTHER PUBLICATIONS

Alshin A., et al., "CE1 (subset B): Multi-parameter probability up-date for CABAC", Nov. 21-30, 2011; (Joint Collaborative Team on Video Coding (JCT-VC) of ITU-T SG16 WP3 and ISO/IEC JTC1/SC29/WG11), doc. No. JCTVC-G764, 7th Meeting: Geneva, Nov. 18, 2011; 4 pages.

(Continued)

*Primary Examiner* — Tat C Chio
(74) *Attorney, Agent, or Firm* — John Rickenbrode

(57) ABSTRACT

An example coding device, such as a video coding (encoding or decoding) device is configured to determine a plurality of estimator functions to be used to calculate a probability of a symbol having a particular value, wherein the symbol is to be binary arithmetic coded according to the probability, and wherein the estimator functions do not include division operations; determine a plurality of weights for the plurality of estimator functions such that when the respective weights are applied to the estimator functions, a resulting sum of outputs of the plurality of estimator functions yields the probability; calculate the probability of the symbol having the particular value, including: execute the estimator functions without using the division operations to determine the outputs; and calculate a sum of the outputs as the probability; and binary arithmetic code the symbol according to the probability of the symbol having the particular value.

33 Claims, 7 Drawing Sheets

(51) Int. Cl.
H04N 19/176 (2014.01)
H04N 19/70 (2014.01)

(56) References Cited

U.S. PATENT DOCUMENTS

2018/0234681 A1* 8/2018 Fu .................. H04N 19/182
2018/0278946 A1 9/2018 Said et al.

OTHER PUBLICATIONS

Alshin, et al., "High precision probability estimation for CABAC," In Proc. IEEE Visual Commun. Image Process, Conf. Kuching, Malyasia, Nov. 2013, 6 pp.

Belyaev E., et al., "Binary Arithmetic Coding System with Adaptive Probability Estimation by Virtual Sliding Window", 2006 IEEE Tenth International Symposium, IEEE, Jun. 28, 2006 (Jun. 28, 2006), pp. 1-5, XP010936892, DOI: 10.1109/ISCE.2006.1689517, ISBN: 978-1-4244-0216-8.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Chen J., et al., "Algorithm Description of Joint Exploration Test Model 7 (JEM 7)," 7th Meeting; Joint Collaborative Team on Video Coding (JCT-VC) of ITU-T SG 16 WP 3 and ISO/IEC JTC 1/SC 29/WG 11, No. JVET-G1001v1, Jul. 13-21, 2017, 50 pp.

Ergen S., "ZigBee/IEEE 802.15.4 Summary", Sep. 10, 2004, 37 pp.

Howard P.G., et al., "Practical Implementations of Arithmetic Coding," Image and Text Compression, J.A. Storer, Ed., Chapter 4, Kluwer Academic Publishers, Norwell, MA, 1992, pp. 85-112.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

International Search Report and Written Opinion—PCT/US2019/037981—ISA/EPO—dated Oct. 9, 2019 (183911WO).

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 pp.

Leighton F.T., et al., "Estimating a Probability Using Finite Memory," IEEE Transactions on Information Theory, vol. 32, No. 6, Nov. 1986, pp. 733-742.

Marpe D., et al., "Context-Based Adaptive Binary Arithmetic Coding in the H.264/AVC Video Compression Standard", IEEE Transactions on Circuits and Systems for Video Technology, vol. 13, No. 7, Jul. 1, 2003, pp. 620-636, XP055120073, ISSN: 1051-8215, DOI: 10.1109/TCSVT.2003.815173.

Meron E., et al., "Finite-Memory Universal Prediction of Individual Sequences," IEEE Transactions on Information Theory, vol. 50, No. 7, Jul. 2004, pp. 1506-1523.

Mitra S.K., "Digital Signal Processing: A Computer-based Approach," Chapter8: "Digital Filter Structures," McGraw-Hill Publishing Co, New York, NY, 4th Ed., 2010, pp. 417-488.

Mukherjee et al. "The latest open-source video codec VP9—an overview and preliminary results," in Proc. 30th Picture Coding Symp., San Jose, CA, Dec. 2013, 4 pages.

Oppenheim A., et al., "Discrete-Time Signal Processing," Chapter 6: "Structures for Discrete-Time Systems," Prentice-Hall, Inc., Saddle River, NJ, 3rd Edition, Aug. 2009, 128 pp.

Pennebaker W.B., et al., "Probability Estimation for the Q-Coder," International Business Machines Corporation, IBM J. Res. Develop. vol. 32, No. 6, Nov. 1988, pp. 737-752.

Richardson I., "The H.264 Advanced Video Compression Standard," Second Edition, John Wiley and Sons, Ltd, Aug. 9, 2010, 337 pp.

Said A., "Arithmetic Coding," Lossless Compression Handbook, K. Sayood, Ed., Academic Press, Chapter 5, Dec. 18, 2003, pp. 101-152.

Said A., et al., "Arithmetic Coding with Context-Dependent Double-Window Adaptation Response", 7. JVET Meeting, Jul. 13, 2017-Jul. 21, 2017, Torino, (The Joint Video Exploration Team of ISO/IEC JTC/SC29/WG11 and ITU-T SG.16); URL: http://phenix.int-evry.fr/jvet/, No. JVET-G0112-v2, Jul. 14, 2017 (Jul. 14, 2017), XP030150916, pp. 1-4.

Said Amir, "Introduction to Arithmetic Coding—Theory and Practice", Technical Report, Apr. 21, 2004, pp. 1-64, Retrieved from the Internet: URL: http://www.hpl.hp.com/techreports/2004/HPL-2004-76.pdf.

Stegemann J., et al., "CE1: Cross-check of Samsung's Multi-Parameter Probability Model up-date for CABAC ( JCTVC-F254)", Joint Collaborative Team on Video Coding (JCT-VC) of ITU-T SG16 WP3 and ISO/IEC JTC1/SC29/WG11, JCTVC-G553, 7th Meeting: Geneva, CH, Nov. 21-30, 2011, 3 pages.

Sze V., et al., "Chapter 8: Entropy Coding in HEVC", Jan. 1, 2014 (Jan. 1, 2014), High Efficiency Video Coding (HEVC), Springer International Publishing, XP009500669, ISBN: 978-3-319-06894-7 table 8.1, pp. 209-269.

Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.

U.S. Appl. No. 62/475,609, filed Mar. 23, 2017, 45 pages. (173564P1).

Wien M, "High Efficiency Video Coding", Coding Tools and specification, Chapter 5, 2015, pp. 133-160.

Witten I.A., et al., "Arithmetic Coding for Data Compression", Communications of the ACM, vol. 30, No. 6, Jun. 1987, pp. 520-540.

* cited by examiner

EFFICIENT WEIGHTED PROBABILITY ESTIMATION FOR BINARY ARITHMETIC CODING

This application claims the benefit of U.S. Provisional Application No. 62/687,136, filed Jun. 19, 2018, the entire contents of which are hereby incorporated by reference.

TECHNICAL FIELD

This disclosure relates to arithmetic coding of data, including arithmetic encoding and decoding of video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to binary arithmetic coding. In video coding, values of syntax elements may be binarized and then entropy encoded by a video encoder, or entropy decoded by a video decoder. In general, entropy encoding involves determining a context for coding (encoding or decoding) a symbol, and then coding the symbol using the context. The context generally indicates a most probable value (e.g., 0 or 1) for the symbol and a probability of the symbol being the most probable value. A video encoder may determine whether the value of the symbol is actually the most probable value or not, and then select a coded representation of one or more symbols including the symbol based on the determination and the context. A video decoder may receive the coded representation and entropy decode the values of the one or more symbols using the coded representation in a reciprocal fashion.

In one example, a method of coding data includes determining a plurality of estimator functions to be used to calculate a probability of a symbol having a particular value, wherein the symbol is to be binary arithmetic coded according to the probability, and wherein the estimator functions do not include division operations; determining a plurality of weights for the plurality of estimator functions such that when the respective weights are applied to the estimator functions, a resulting sum of outputs of the plurality of estimator functions yields the probability; calculating the probability of the symbol having the particular value, comprising: executing the estimator functions without using the division operations to determine the outputs of the estimator functions; and calculating a sum of the outputs as the probability; and binary arithmetic coding the symbol according to the probability of the symbol having the particular value.

In another example, a device for coding data includes a memory configured to store data; and a processor implemented in circuitry and configured to: determine a plurality of estimator functions to be used to calculate a probability of a symbol having a particular value, wherein the symbol is to be binary arithmetic coded according to the probability, and wherein the estimator functions do not include division operations; determine a plurality of weights for the plurality of estimator functions such that when the respective weights are applied to the estimator functions, a resulting sum of outputs of the plurality of estimator functions yields the probability; calculate the probability of the symbol having the particular value, wherein to calculate the probability, the processor is configured to: execute the estimator functions without using the division operations to determine the outputs of the estimator functions; and calculate a sum of the outputs as the probability; and binary arithmetic code the symbol according to the probability of the symbol having the particular value.

In another example, a computer-readable storage medium has stored thereon instructions that, when executed, cause a processor to: determine a plurality of estimator functions to be used to calculate a probability of a symbol having a particular value, wherein the symbol is to be binary arithmetic coded according to the probability, and wherein the estimator functions do not include division operations; determine a plurality of weights for the plurality of estimator functions such that when the respective weights are applied to the estimator functions, a resulting sum of outputs of the plurality of estimator functions yields the probability; calculate the probability of the symbol having the particular value, comprising instructions that cause the processor to: execute the estimator functions without using the division operations to determine the outputs of the estimator functions; and calculate a sum of the outputs as the probability; and binary arithmetic code the symbol according to the probability of the symbol having the particular value.

In another example, a device for coding data includes means for determining a plurality of estimator functions to be used to calculate a probability of a symbol having a particular value, wherein the symbol is to be binary arithmetic coded according to the probability, and wherein the estimator functions do not include division operations; means for determining a plurality of weights for the plurality of estimator functions such that when the respective weights are applied to the estimator functions, a resulting sum of outputs of the plurality of estimator functions yields the probability; means for calculating the probability of the symbol having the particular value, comprising: means for executing the estimator functions without using the division operations to determine the outputs of the estimator functions; and means for calculating a sum of the outputs as the probability; and means for binary arithmetic coding the symbol according to the probability of the symbol having the particular value.

The details of one or more examples are set forth in the accompanying drawings and the description below. Other features, objects, and advantages will be apparent from the description and drawings, and from the claims.

DETAILED DESCRIPTION

Figure 1:
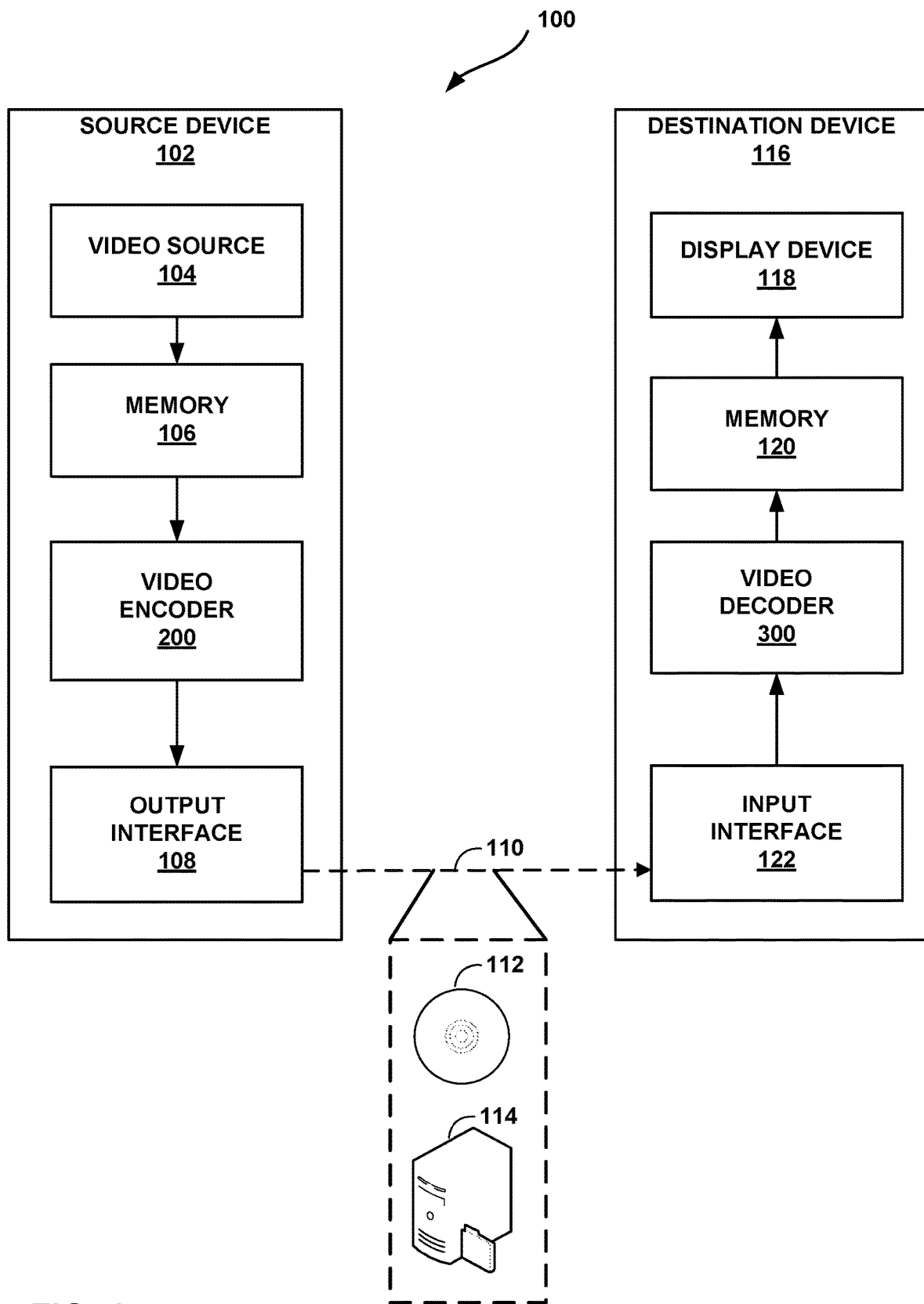
FIG. 1 is a block diagram illustrating an example video encoding and decoding system that may perform the techniques of this disclosure.

Adaptive arithmetic coding (AAC) is an important entropy coding tool used in data compression. It was optional in the ITU-T H.264/Advanced Video Coding (AVC) standard, and became the only entropy coding technique of video coding standards ITU-T H.265/High Efficiency Video Coding (HEVC) and VP9. Due to its superior compression efficiency, AAC is expected to remain as the only entropy coding technique used in future video coding standards.

One of the most important stages of adaptive arithmetic coding is the estimation of the probability of binary data symbols, for values of all of the syntax elements that need to be entropy coded. The techniques of this disclosure are applicable to the form of probability estimation currently being studied for inclusion in the upcoming Versatile Video Coding (VVC) standard, which is defined by a weighted sum of probability estimators.

The techniques of this disclosure may provide a more efficient way to compute the final probability estimation in that scheme, by using an alternative mathematical formulation, which may produce nearly identical results, but may reduce the number of arithmetic operations performed. In this manner, these techniques may improve the functioning of a computer, a video coder, a processor, or other such devices used in video coding, in that fewer arithmetic operations can be performed.

Many modern video coding standards adopt the approach of decomposing entropy coding into modeling and actual coding. Thus, the binary arithmetic coding process may be divided into three main stages. In the first stage, binarization, each data element (or syntax element) to be coded is first decomposed into a sequence of binary data symbols (bins). Since binary symbol probabilities depend on the data element and binary symbol position in its decomposition, a bin context (or simply context) is assigned for each type of binary symbol, uniquely identifying the probability estimate to be used for its entropy coding.

In the second stage, adaptive probability estimation, a video coder (encoder or decoder) updates its probability estimates based on the bin values that have been previously encoded or decoded. This is because it is assumed that all bins assigned to a given context have similar, but not exactly equal probabilities.

In the third stage, arithmetic coding, the video coder performs arithmetic coding. That is, the video coder entropy codes the value of each binary symbol (0 or 1) using the estimated probability of its value, which is defined by the bin's corresponding context.

Basic mathematical formulations related to entropy coding are discussed below. The equations below are defined for real-valued numbers, following usual conventions, and lower-case letters represent real-valued variables.

Binary probability estimation, i.e., the problem of estimating the probability of a random binary data source, is related to the well-known Bernoulli (or binomial) trials, and thus, has been studied for many decades. However, its use for entropy coding is still under development because, in practical applications, the estimation method has to take into account two conflicting objectives. First, compression efficiency generally improves with higher accuracy of the probability estimates, and the ability to change estimates quickly while preserving accuracy, which require higher computational complexity. Second, since arithmetic coding speed can severely limit the throughput of a compression and decompression system (in Mbits/sec), it should be done with extremely small computational complexity.

Due to the low-complexity requirements, most methods of probability estimation for binary arithmetic coding have been based on finite-state-machines (FSM), since the first practical implementations of arithmetic coding. Definitions for the notation used to explain the basics of these techniques are provided below, which are the most commonly used in coding applications.

Assuming that we have a sequence of N symbols, $\{b[k]\}_{k=1}^{N}$, from a binary random data source (i.e., $b[k] \in \{0, 1\}$), an unknown sequence $\{p_T[k])\}_{k=1}^{N}$ of true probabilities for symbol 1, i.e., $p_T[k]$=Prob($b[k]$=1), binary probability estimation is the problem of finding a sequence of estimated probabilities $\{p[k]\}_{k=1}^{N}$ that best approximates the true probabilities, under the causality condition, i.e., $p[n]$ can only depend on the set of "past" bins $\{b[k]\}_{k=1}^{n-1}$.

One type of probability estimation finite-state-machine, that has been widely adopted—and has been "rediscovered" and renamed several times in the past decades—has an adaptation parameter $0<\alpha<1$, and the recursive form:

$$p[k+1]=\alpha*b[k]+(1-\alpha)*p[k] \qquad (1)$$

In a practical encoding application, both the encoder and decoder start with the same initial probability estimate p[1] (commonly from a value like ½, or a shared fixed table), and then each bin b[k] is sequentially optimally encoded and decoded using probability estimated p[k], with each probability estimate being updated with equation (1) after each bin is encoded or decoded. Since this is a recursive equation, each probability value depends on all the previously encoded bins or decoded bins.

Standard signal processing shows that, when equation (1) is used, the estimated probability values are dependent on previously coded bins, using exponentially decreasing weights. For that reason, this probability estimation technique was called exponential aging by Howard and Vitter, who suggested using a value of α=0.04 in practical coding applications. The context-adaptive binary arithmetic coding (CABAC) arithmetic coding method, adopted in the H.264/AVC and H.265/HEVC video coding standards, also uses this approach, using a value α=0.0508. The main differences from previous implementations are related to its use of a finite-state-machine based on a table look-up.

More recently, the same approach has been called exponentially decaying memory by Meron and Feder, and by Belyaev, Gilmutdinov, and Turlikov. The latter call it a "virtual sliding window" technique, since the equivalent form:

$$p[k+1] = \frac{b[k]}{W} + \left(1 - \frac{1}{W}\right)p[k] \qquad (2)$$

is related to a randomized algorithm for probability estimation, using a "sliding window" of W bins. Furthermore, they demonstrate that it can be efficiently implemented with integer arithmetic when W is a power of two, in the form:

$$p[k+1] = p[k] + \left(\frac{b[k] - p[k]}{2^S}\right), \qquad (3)$$

since the high-complexity division can be replaced by efficient integer bitwise shifts.

One practical problem with the preceding estimation formulas ((1)-(3)) is that different "window" values W may be needed, according to the binary data of a given context. If the probabilities of bin values change slowly, or the bin value probabilities are very different (for example, Prob(b[k]=1)>>Prob(b[k]=0)), then more compression is obtained by larger values of W, because they average over a larger number of previous bin values. On the other hand, small values of W are needed when the probabilities change rapidly and frequently.

One solution to this problem, proposed by Alshin, Alshina, and Park, is to define a number M of adaptation parameters $\{\alpha_i\}_{i=1}^{M}$, and weights $\{\gamma_i\}_{i=1}^{M}$, such that:

$$\Sigma_{i=1}^{M}\gamma_i=1, 0<\alpha_i<1, \gamma_i>0, i=1,2,\ldots,M, \qquad (4)$$

use several probability estimators (that is, probability estimator functions), in the same recursive form of equation (1):

$$q_i[k+1]=\alpha_i b[k]+(1-\alpha_i)q_i[k], i=1,2,\ldots,M, \qquad (5)$$

and then compute the final estimate as the weighted average:

$$p[k+1]=\Sigma_{i=1}^{M}\gamma_i q_i[k+1]. \qquad (6)$$

This approach proved to be more efficient in coding applications because, as explained in a previous disclosure, equation (1) corresponds to a first-degree recursive discrete time dynamic system (commonly known as an infinite impulse response, or IIR, discrete time filter), while equation (6) defines a high order IIR filter, implemented in a parallel configuration.

Details regarding efficient practical implementations are discussed below, where all values may be represented as integer, and all arithmetic operations are defined with a fixed number of bits. To make distinctions with respect to the discussion above clear, all integer variables are represented with capital letters in the discussion below.

In a practical implementation of arithmetic coding, the encoder and decoder must implement exactly the same arithmetic operations. For that reason, and also to reduce implementation costs, practical arithmetic coding is done solely with integer arithmetic operations, on scaled values of probabilities.

Using L bits to represent the probabilities, the scaled version of probability estimation values may be defined as:

$$P[k]=2^L p[k], \qquad (7)$$

and have equation (3) implemented as:

$$P[k+1] = \begin{cases} P[k] - \left\lfloor \frac{P[k]}{2^S} \right\rfloor, & b[k] = 0 \\ P[k] + \left\lfloor \frac{2^L - P[k]}{2^S} \right\rfloor, & b[k] = 1 \end{cases}, \qquad (8)$$

where all divisions by $2^S$, followed by the floor $\lfloor \cdot \rfloor$ operations, are done using binary shifts.

Using the same notation, the probability estimation method of A. Alshin, E. Alshina, and J.-H. Park, "High precision probability estimation for CABAC," in Proc. IEEE Visual Commun. Image Process. Conf., Kuching, Malaysia, November 2013, which has been used in the ITU/MPEG Joint Experimental Model (JEM) for video coding, and is a particular version of equation (6), is defined by:

$$Q_1[k+1] = \begin{cases} Q_1[k] - \left\lfloor \frac{Q_1[k]}{2^4} \right\rfloor, & b[k] = 0 \\ Q_1[k] + \left\lfloor \frac{2^{15} - Q_1[k]}{2^4} \right\rfloor, & b[k] = 1 \end{cases}$$

$$Q_2[k+1] = \begin{cases} Q_2[k] - \left\lfloor \frac{Q_2[k]}{2^8} \right\rfloor, & b[k] = 0 \\ Q_1[k] + \left\lfloor \frac{2^{15} - Q_2[k]}{2^8} \right\rfloor, & b[k] = 1 \end{cases} \qquad (9)$$

$$P[k+1] = \left\lfloor \frac{Q_1[k+1] + Q_2[k+1]}{2} \right\rfloor$$

One main practical problem related to probability estimation using equation (6) is that the multiplications by the weights of each estimation value represents a large increment in complexity. That is, the reason that the implementation of equation (9) only uses two values, with weight equal to ½, is so that the multiplication by the fractions is done with a single bit shift. However, it may be beneficial to use unequal weights to improve compression.

A second problem is that, for adaptive arithmetic coding, some needed multiplications are commonly approximated with table look-ups, and the size of those tables is halved when only the probability of the least-probable-symbol (LPS) is estimated. However, the estimation process of equation (9) uses values $Q_1$ and $Q_2$ as state elements, which makes it difficult to use the common technique of estimating only the probability of the LPS, since we can have $Q_1>½$ and $Q_2<½$ simultaneously, or vice versa.

The third problem is that, to minimize computational complexity, especially in custom hardware implementations, it is necessary to minimize the number of bits needed to represent the probability estimation FSM (coding context), since that data needs to be read, updated, and then saved back to memory. However, the minimum number of bits depends on the estimation "window" sizes, but using different numbers of bits per size adds more operations per estimation.

The techniques of this disclosure may address those three problems by exploiting some mathematical properties of the estimation process, and change in the definition of the state in the probability estimation finite-state-machine.

In accordance with the techniques of this disclosure, the mathematical property that is used to reduce complexity is defined by a change in variables in equations (5) and (6), as follows $$q_i'[k+1]=\alpha_i(\gamma_i b[k])+(1-\alpha_i)q_i'[k], i=1,2,\ldots,M \quad (10)$$

$$p[k+1]=\Sigma_{i=1}^{M} q_i'[k+1], \quad (11)$$

which adds the products of the weights $\gamma_i$ from equation (11) to equation (10). However, since $b[k]\in\{0,1\}$, the new products correspond to only binary choices, plus addition.

For the integer implementation, using integers with L bits to represent scaled probabilities (as defined in equation (7)), and a set of integer weights $\{W_i\}_{i=1}^{M}$, such that:

$$\Sigma_{i=1}^{M} W_i = 2^L, W_i > 0, i=1,2,\ldots,M, \quad (12)$$

then the weighted probability estimation, corresponding to equations (5) and (6), can be computed using only additions and bit shifts, and without multiplications. In particular, the weighted probability estimation can be calculated using the following equations:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases} \quad (13)$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases}$$

$$P[k+1] = \sum_{i=1}^{M} Q_i[k+1].$$

In this example, $\{S_1, \ldots S_M\}$ are shift parameters for bitwise shift operations. If it is desirable to use a set $\{L_i\}_{i=1}^{M}$ to define unequal maximum numbers of bits needed for the representation of partial estimator functions $Q_i$, then the constraints on weights in equation (12) can be replaced with:

$$\Sigma_{i=1}^{M} 2^{L-L_i} W_i = 2^L, W_i > 0, i=1,2,\ldots,M, \quad (14)$$

and have the estimation done as:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases} \quad (15)$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases}$$

$$P[k+1] = \sum_{i=1}^{M} 2^{L-L_i} Q_i[k+1].$$

The case when M=2 and equal weights, exemplified by equation (9), now can be defined as:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{2^{L-1} - Q_1[k]}{2^{S_1}} \right\rfloor, & b[k] = 1 \end{cases} \quad (16)$$

$$Q_2[k+1] = \begin{cases} Q_2[k] - \left\lfloor \frac{Q_2[k]}{2^{S_2}} \right\rfloor, & b[k] = 0 \\ Q_2[k] + \left\lfloor \frac{2^{L-1} - Q_2[k]}{2^{S_2}} \right\rfloor, & b[k] = 1 \end{cases}$$

$$P[k+1] = Q_1[k+1] + Q_2[k+1]$$

which eliminates a bit-shift operation, relative to equation (9).

The remaining problem from previous techniques is the fact that, if the state of the estimator is saved in memory as the tuple $$(Q_1[k], Q_2[k], \ldots, Q_M[k]), \quad (17)$$

then there is still the problem that, whenever the value of latest probability estimation is needed, it has to be computed as:

$$P[k] = \Sigma_{i=1}^{M} 2^{L-L_i} Q_i[k]. \quad (18)$$

However, if $L_1 = L$, then the tuple $$(P[k], Q_1[k], \ldots, Q_M[k]), \quad (19)$$

can be used as the state of the probability estimation machine. Then, $$Q_1[k] = P[k] - \Sigma_{i=2}^{M} 2^{L-L_i} Q_i[k] \quad (20)$$

can be computed only when $Q_1$ needs to be updated.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for efficient weighted probability estimation for binary arithmetic coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for efficient weighted probability estimation for binary arithmetic coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM. According to JEM, a video coder (such as video encoder 200) partitions a picture into a plurality of coding tree units (CTUs). Video encoder 200 may partition a CTU according to a tree structure, such as a quadtree-binary tree (QTBT) structure. The QTBT structure of JEM removes the concepts of multiple partition types, such as the separation between CUs, PUs, and TUs of HEVC. A QTBT structure of JEM includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In some examples, video encoder 200 and video decoder 300 may use a single QTBT structure to represent each of the luminance and chrominance components, while in other examples, video encoder 200 and video decoder 300 may use two or more QTBT structures, such as one QTBT structure for the luminance component and another QTBT structure for both chrominance components (or two QTBT structures for respective chrominance components).

Video encoder 200 and video decoder 300 may be configured to use quadtree partitioning per HEVC, QTBT partitioning according to JEM, or other partitioning structures. For purposes of explanation, the description of the techniques of this disclosure is presented with respect to QTBT partitioning. However, it should be understood that the techniques of this disclosure may be also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

JEM also provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. JEM provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized according to a corresponding shift parameter.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The context may indicate, for example, a most probable symbol for a particular bin of a binarized string, as well as a probability of the bin having the most probable symbol.

Video encoder 200 may determine the probability using the techniques of this disclosure, as discussed in greater detail below. In particular, video encoder 200 may execute a plurality of estimator functions using respective weights, where execution of the estimator functions may include avoiding division (and potentially multiplication), instead using bitwise right- and/or left-shift operations using respective shift parameters in place of division and multiplication operations, respectively. A sum of the outputs of the estimator functions may indicate the probability.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

Moreover, in accordance with the techniques of this disclosure, video encoder 200 may use any or all of equations (10)-(20) as explained above when CABAC-encoding values of syntax elements. More particularly, video encoder 200 may perform CABAC encoding of values of syntax elements of video data. During CABAC encoding, video encoder 200 may binarize data elements into a sequence of bins, and then encode each of the bins. In particular, during encoding of the bins, video encoder 200 may adaptively estimate a probability of a bin having a most probable symbol (e.g., 0 or 1) in a manner that uses only addition and bit-shifts, while avoiding multiplication and/or division operations. For example, video encoder 200 may use any of equations 13, 15, or 16 to perform the probability estimation. After estimating the probability, video encoder 200 may use the estimated probability to arithmetically encode the bin. For example, video encoder 200 may select data representing whether the actual value of the bin has the most probable symbol or does not have the most probable symbol according to the estimated probability.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200.

In particular, in accordance with the techniques of this disclosure, video decoder 300 may use any or all of equations (10)-(20) as explained above when CABAC-decoding values of syntax elements. More particularly, video decoder 300 may perform CABAC decoding of values of syntax elements of video data. During CABAC decoding, video decoder 300 receive data representing whether one or more bins in a bin sequence have respective most probable symbols or not. In particular, during decoding of the bins, video decoder 300 may adaptively estimate a probability of a bin having a most probable symbol (e.g., 0 or 1) in a manner that uses only addition and bit-shifts, while avoiding multiplication and/or division. For example, video decoder 300 may use any of equations 13, 15, or 16 to perform the probability estimation. After estimating the probability, video decoder 300 may use the estimated probability to arithmetically decode the bin. For example, video decoder 300 may determine whether the data represents that the actual value of the bin has the most probable symbol or not according to the estimated probability. Video decoder 300 may ultimately reconstruct values of syntax elements from one or more decoded bins of binarized values.

The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
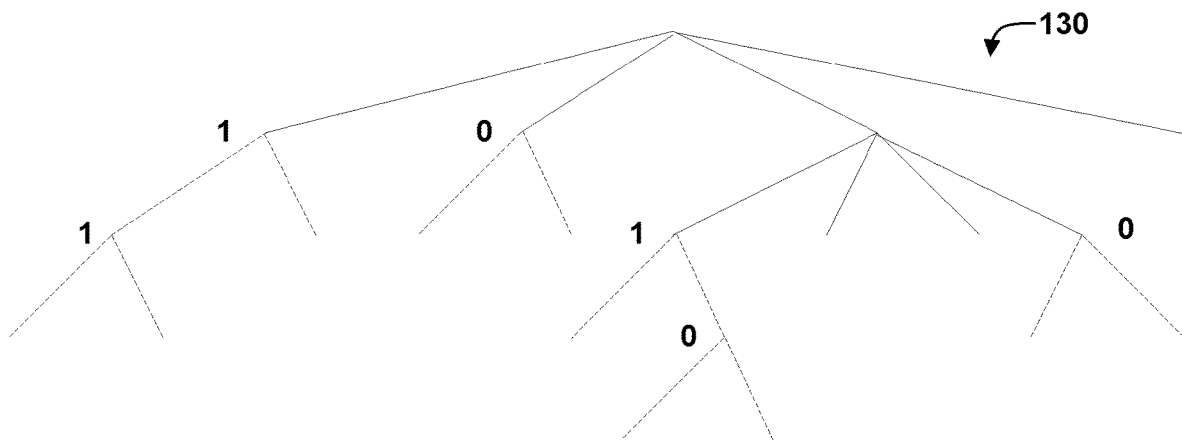
FIGS. 2A and 2B are conceptual diagrams illustrating an example quadtree binary tree (QTBT) structure, and a corresponding coding tree unit (CTU).
Figure 2B:
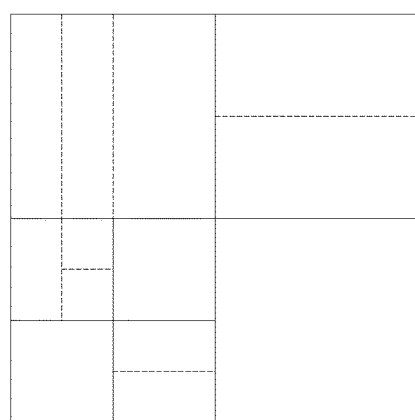

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), they can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the leaf quadtree node is 128×128, it will not be further split by the binary tree, since the size exceeds the Max BTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches Max BTDepth (4, in this example), no further splitting is permitted. When the binary tree node has width equal to Min BTSize (4, in this example), it implies no further horizontal splitting is permitted. Similarly, a binary tree node having a height equal to Min BTSize implies no further vertical splitting is permitted for that binary tree node. As noted above, leaf nodes of the binary tree are referred to as CUs, and are further processed according to prediction and transform without further partitioning.

Figure 3:
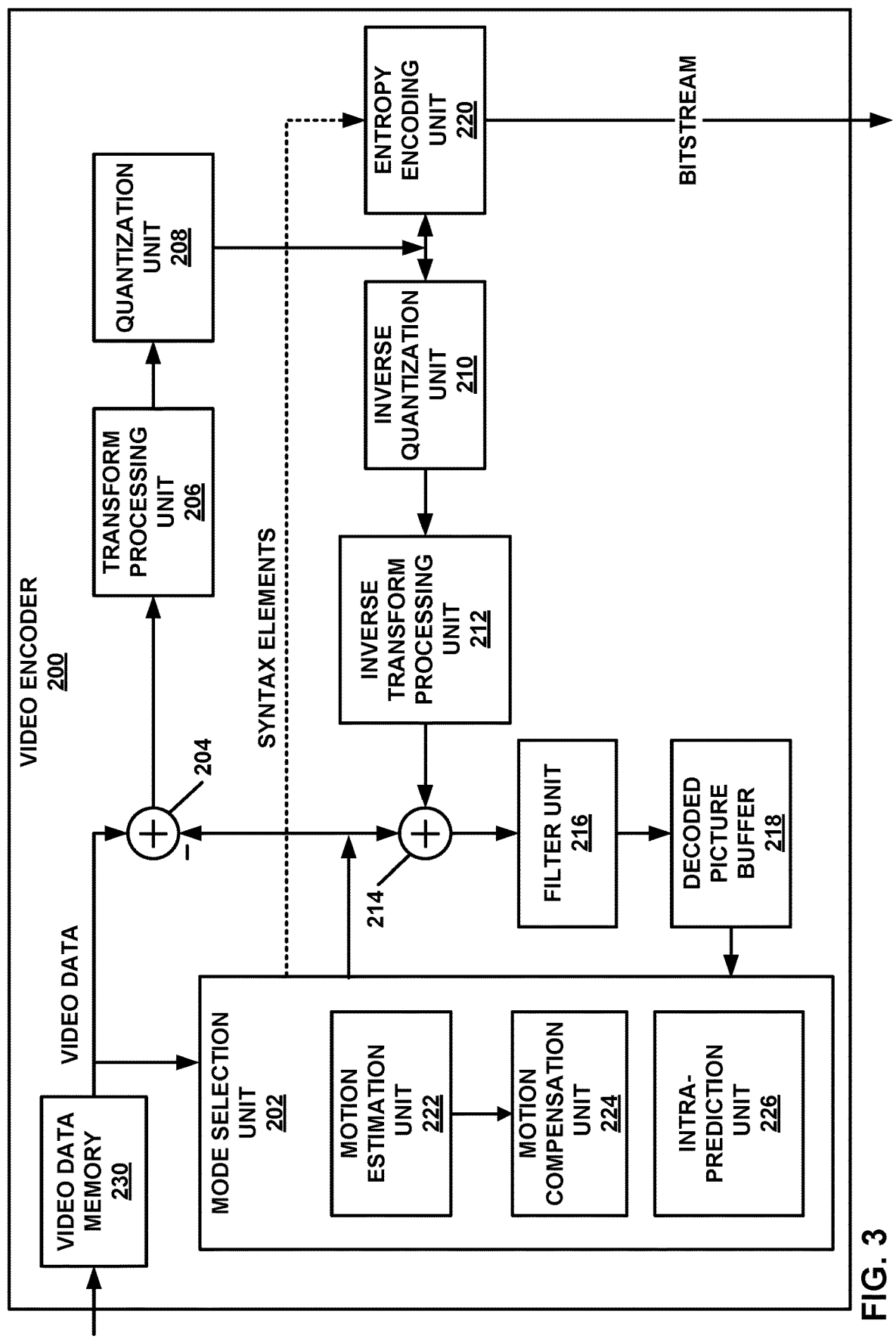
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 224 are not needed, reconstruction unit 214 may store reconstructed blocks to DPB 218. In examples where operations of filter unit 224 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In particular, in accordance with the techniques of this disclosure, entropy encoding unit 220 may use any or all of equations (10)-(20) when performing CABAC to encode the coefficients and/or other values of syntax elements. That is, entropy encoding unit 220 may determine a probability of a bin of a binarized value having a most probable symbol in accordance with, e.g., any or all of equations (10)-(20). When executing these equations, entropy encoding unit 220 may avoid performing division operations, and instead perform bitwise right-shift operations using shift parameters in place of the division operations (and likewise, bitwise left-shift operations in place of multiplication operations).

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a coding device configured to encode video data including a memory configured to store data; and a processor implemented in circuitry and configured to: determine a plurality of estimator functions to be used to calculate a probability of a symbol having a particular value, wherein the symbol is to be binary arithmetic coded according to the probability, and wherein the estimator functions do not include division operations; determine a plurality of weights for the plurality of estimator functions such that when the respective weights are applied to the estimator functions, a resulting sum of outputs of the plurality of estimator functions yields the probability; calculate the probability of the symbol having the particular value, wherein to calculate the probability, the processor is configured to: execute the estimator functions without using the division operations to determine the outputs of the estimator functions; and calculate a sum of the outputs as the probability; and binary arithmetic code the symbol according to the probability of the symbol having the particular value. For example, video encoder 200 may perform the functions of any of equations 13, 15, or 16 to determine the probability of the symbol having the particular value.

Figure 4:
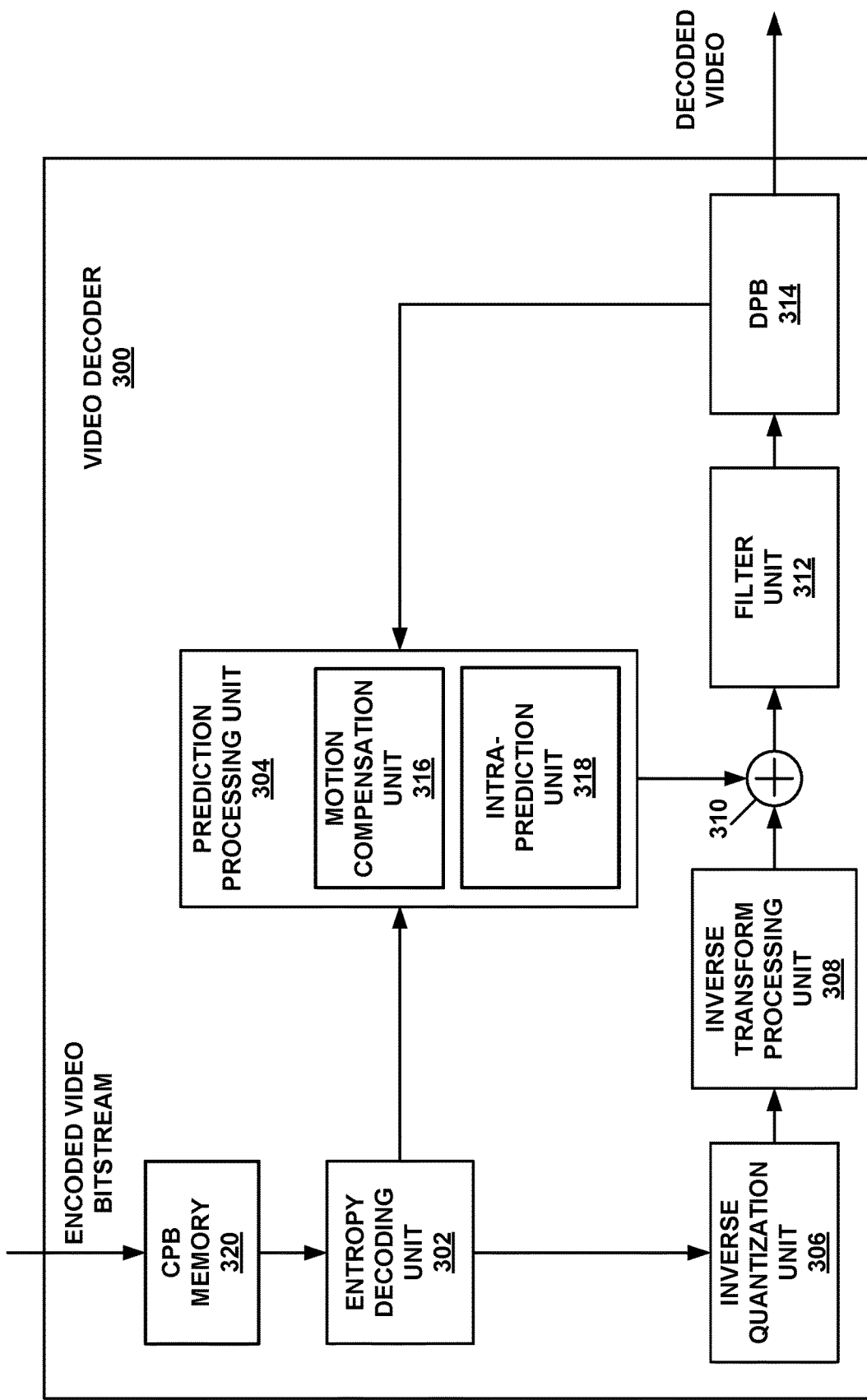
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. In particular, in accordance with the techniques of this disclosure, entropy decoding unit 302 may use any or all of equations (10)-(20) when performing CABAC to decode the coefficients and/or other values of syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store data; and a processor implemented in circuitry and configured to: determine a plurality of estimator functions to be used to calculate a probability of a symbol having a particular value, wherein the symbol is to be binary arithmetic coded according to the probability, and wherein the estimator functions do not include division operations; determine a plurality of weights for the plurality of estimator functions such that when the respective weights are applied to the estimator functions, a resulting sum of outputs of the plurality of estimator functions yields the probability; calculate the probability of the symbol having the particular value, wherein to calculate the probability, the processor is configured to: execute the estimator functions without using the division operations to determine the outputs of the estimator functions; and calculate a sum of the outputs as the probability; and binary arithmetic code the symbol according to the probability of the symbol having the particular value. For example, video decoder 300 may perform the functions of any of equations 13, 15, or 16 to determine the probability of the symbol having the particular value.

Figure 5:
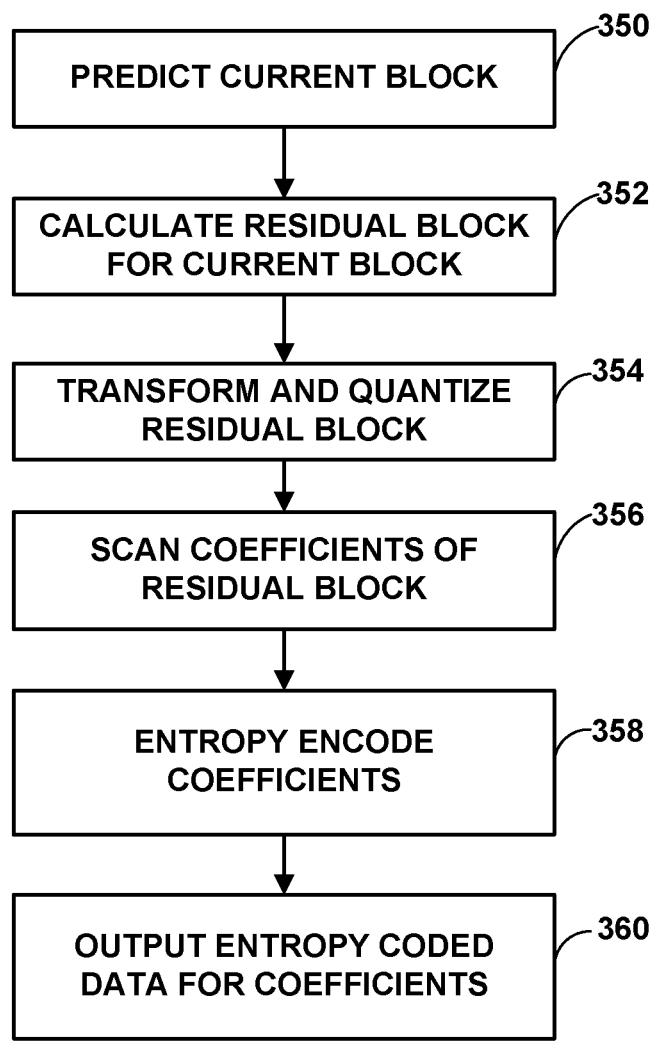
FIG. 5 is a flowchart illustrating an example method for encoding a current block according to the techniques of this disclosure.

FIG. 5 is a flowchart illustrating an example method for encoding a current block according to the techniques of this disclosure. The current block may comprise a current CU. Although described with respect to video encoder 200 (FIGS. 1 and 2), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CABAC. In particular, in accordance with the techniques of this disclosure, video encoder 200 may use any or all of equations (10)-(20) when performing CABAC to encode the coefficients and/or other values of syntax elements. Video encoder 200 may then output the entropy coded data of the block (360).

In this manner, the method of FIG. 5 represents an example of a method of encoding data, the method including determining a probability of a symbol to be binary arithmetic coded having a particular value using only addition and bit shift operations, and binary arithmetic encoding the symbol according to the determined probability of the symbol having the particular value.

Figure 6:
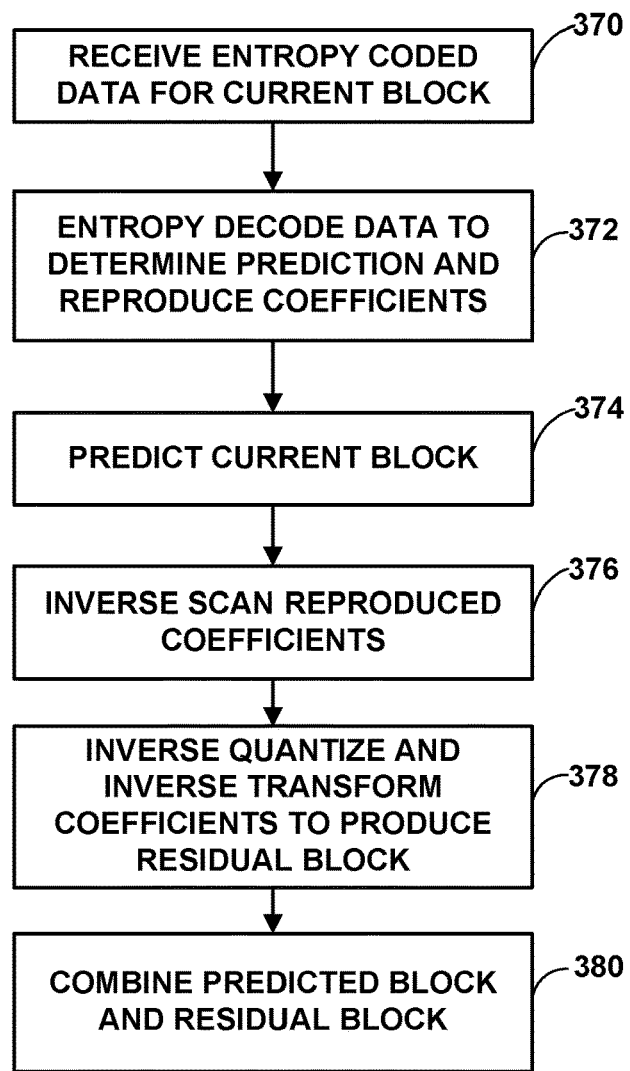
FIG. 6 is a flowchart illustrating an example method for decoding a current block of video data.

FIG. 6 is a flowchart illustrating an example method for decoding a current block of video data according to the techniques of this disclosure. The current block may comprise a current CU. Although described with respect to video decoder 300 (FIGS. 1 and 3), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). In particular, in accordance with the techniques of this disclosure, video decoder 300 may use any or all of equations (10)-(20) when performing CABAC to decode the coefficients and/or other values of syntax elements. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

In this manner, the method of FIG. 6 represents an example of a method of decoding data, the method including determining a probability of a symbol to be binary arithmetic coded having a particular value using only addition and bit shift operations, and binary arithmetic decoding the symbol according to the determined probability of the symbol having the particular value.

Figure 7:
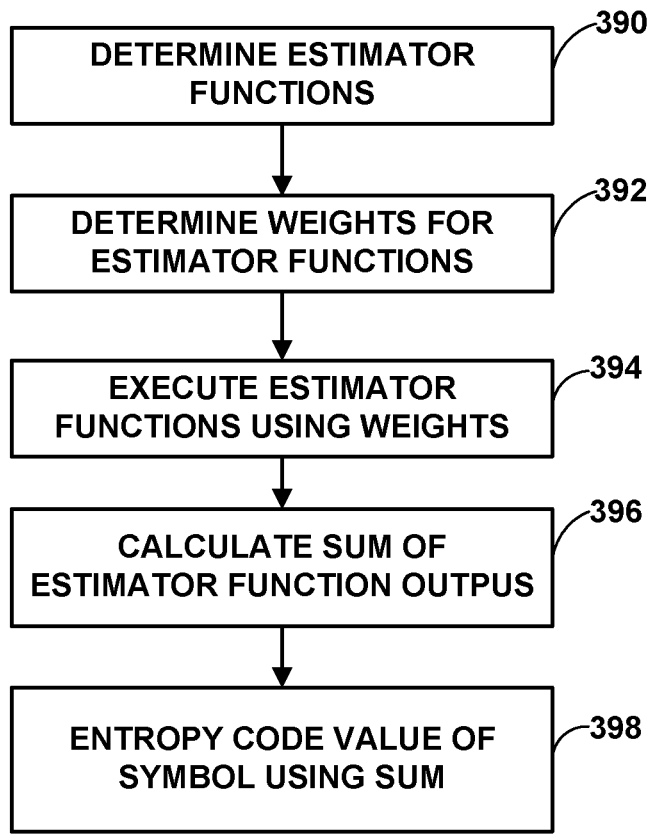
FIG. 7 is a flowchart illustrating an example method of entropy coding data according to the techniques of this disclosure.

FIG. 7 is a flowchart illustrating an example method of entropy coding data according to the techniques of this disclosure. In this example, "coding" may refer to encoding or decoding. Thus, the method of FIG. 7 may be performed by, e.g., video encoder 200 or video decoder 300. Additionally, the method of FIG. 7 may be performed during a video encoding process (e.g., step 358 of FIG. 5), during a video decoding process (e.g., step 372 of FIG. 6), or during arithmetic coding of other types of data. For purposes of example and explanation, the method of FIG. 7 is explained with respect to video encoder 200, although variations with respect to a video encoding process are also discussed below.

Initially, in an example in which video data is encoded, video encoder 200 may generate a binarized value for a syntax element of a video bitstream. The binarized value may include a string of one or more bits, or "bins," each of which has a binary value, e.g., zero or one. Video encoder 200 may CABAC encode each of the bins according to a context, where the context represents a most probable symbol for the bin (e.g., 0 or 1) and a probability of the bin having the most probable symbol. Video encoder 200 may determine whether the actual value of the bin is the most probable symbol or not, and generate a value representing this determination (as well as a series of other such determinations for other such bins). Video decoder 300, similarly, may also determine the context, but use a received value to determine whether the actual value of a current bin is the most probable symbol or not. The method of FIG. 7 represents an example by which video encoder 200, video decoder 300, and other binary arithmetic coding devices can determine a probability of a bin or other symbol having a particular value.

In the example of FIG. 7, it is assumed that video encoder 200 has already generated a binarized value for a syntax element, and that video encoder 200 has a current bin of the binarized value ready to be encoded. To determine a probability of the bin having a most probable value, video encoder 200 may initially determine a plurality of estimator functions (390) to be used to calculate respective probabilities of the bin having the most probable value. Video encoder 200 may also determine weights for the estimator values (392). For example, video encoder 200 may select the estimator functions as one of equations 13, 15, or 16, discussed above. Furthermore, in these equations, the weights are shown as $W_i$ or $2^{L-1}$. In each case, the sum of each of the weights for the estimator functions may be 1.

The estimator functions and weights may be constructed such that division operations need not be performed, but instead, the functions can be performed using only, e.g., additions/subtractions and bitwise shift operations. As such, where divisions are shown in equations 13, 15, or 16, such divisions have denominators of numbers that are powers of two, such that the divisions can be achieved using bitwise right-shift operations using corresponding shift parameters. Likewise, the weights may be selected such that a sum of the outputs of the estimator functions yields the probability of the current bin having the most probable symbol.

Video encoder 200 may then execute the estimator functions using the weights (394), without executing division operations, to calculate respective outputs for the estimator functions. Again, as discussed above, where division operations are shown, video encoder 200 may instead perform bitwise right-shift operations. In addition, video encoder 200 may avoid multiplication operations, and instead perform bitwise left-shift operations.

Video encoder 200 may then calculate a sum of the estimator function outputs (396) as the probability of the bin having the most probable symbol. Video encoder 200 may then code (encode, in this example) the value of the symbol (i.e., the bin, in this example) using the sum (398). For example, video encoder 200 may use the probability (indicated by the sum) to divide a range of possible values proportionally to the probability into two sub-ranges of values, then select a value in one of the two sub-ranges according to whether the actual value of the bin is, or is not, the most probable symbol. In a decoding process, by contrast, video decoder 300 may receive such a value, divide a range of possible values proportionally to the probability into two sub-ranges of values, and determine an actual value for the bin (or symbol) based on which of the two sub-ranges includes the received value.

In this manner, the method of FIG. 7 represents an example of a method of coding data including determining a plurality of estimator functions to be used to calculate a probability of a symbol having a particular value, wherein the symbol is to be binary arithmetic coded according to the probability, and wherein the estimator functions do not include division operations; determining a plurality of weights for the plurality of estimator functions such that when the respective weights are applied to the estimator functions, a resulting sum of outputs of the plurality of estimator functions yields the probability; calculating the probability of the symbol having the particular value, comprising: executing the estimator functions without using the division operations to determine the outputs of the estimator functions; and calculating a sum of the outputs as the probability; and binary arithmetic coding the symbol according to the probability of the symbol having the particular value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding data, the method comprising:
calculating a plurality of estimator functions to generate a respective plurality of outputs to be used to calculate a probability of a symbol having a particular value based on a prior value of the symbol, wherein the symbol is to be binary arithmetic coded according to the probability, and wherein calculating the estimator functions does not include performing division operations,
wherein calculating the plurality of estimator functions comprises using a plurality of weights and a plurality of shift parameters,
wherein, for the prior value of the symbol being non-zero, calculating a first of the estimator functions comprises subtracting, from a prior output of the first of the estimator functions, a value based on the prior output of the first of the estimator functions shifted by a first of the shift parameters, and adding a value based on a first of the weights shifted by the first shift parameter and
wherein, for the prior value of the symbol being non-zero, calculating a second of the estimator functions comprises subtracting, from a prior output of the second of the estimator functions, a value based on the prior output of the second of the estimator functions shifted by a second of the shift parameters, and adding a value based on a second of the weights shifted by the second shift parameter,
wherein the first of the shift parameters is different from the second of the shift parameters and the first of the weights is different from the second of the weights;
calculating the probability of the symbol having the particular value, comprising
calculating a sum of the outputs of the estimator functions as the probability; and
binary arithmetic coding the symbol according to the probability of the symbol having the particular value.

2. The method of claim 1, wherein calculating the probability comprises calculating the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases},$$

$$P[k+1] = \sum_{i=1}^{M} Q_i[k+1]$$

wherein k+1 represents a coding order of the symbol, $\{W_1, \ldots, W_M\}$ comprises the weights, and $\{Q_1[k+1], \ldots Q_M[k+1]\}$ comprises the estimator functions, P[k+1] comprises the probability of the symbol, $\{S_1, \ldots S_M\}$ comprise the shift parameters, b[k] represents the prior value of the symbol, and wherein calculating the estimator functions comprises performing right-shift operations using the shift parameters instead of division operations.

3. The method of claim 1, wherein calculating the probability comprises calculating the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases},$$

$$P[k+1] = \sum_{i=1}^{M} 2^{L-L_i} Q_i[k+1]$$

wherein k+1 represents a coding order of the symbol, $\{W_1, \ldots, W_M\}$ comprises the weights, $\{S_1, \ldots S_M\}$ comprise shift parameters, P[k+1] comprises the probability of the symbol, $\{Q_1[k+1], \ldots, Q_M[k+1]\}$ comprises the estimator functions, L comprises a number of bits to represent scaled probabilities, $\{L_i\}_{i=1}^{M}$ comprises a maximum numbers of bits needed for the representation of the estimator functions, b[k] represents the prior value of the symbol, and wherein calculating the estimator functions comprises performing right-shift operations using the shift parameters instead of division operations.

4. The method of claim 1, wherein calculating the probability comprises calculating the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{2^{L-1} - Q_1[k]}{2^{S_1}} \right\rfloor, & b[k] = 1 \end{cases}$$

$$Q_2[k+1] = \begin{cases} Q_2[k] - \left\lfloor \frac{Q_2[k]}{2^{S_2}} \right\rfloor, & b[k] = 0 \\ Q_2[k] + \left\lfloor \frac{2^{L-1} - Q_2[k]}{2^{S_2}} \right\rfloor, & b[k] = 1 \end{cases}$$

$$P[k+1] = Q_1[k+1] + Q_2[k+1]$$

wherein k+1 represents a coding order of the symbol, L comprises a number of bits, $2^{L-1}$ comprises the weights, $\{S_1, S_2\}$ comprise shift parameters, $\{Q_1[k+1], Q_2[k+1]\}$ comprises the estimator functions, P[k+1] comprises the probability of the symbol, b[k] represents the prior value of the symbol, and wherein calculating the estimator functions comprises performing right-shift operations using the shift parameters instead of division operations.

5. The method of claim 1, further comprising maintaining a plurality of state elements $Q_1$ to $Q_M$ for a finite state machine used to calculate the probability as the tuple (P[k], $Q_1$[k], ..., $Q_M$[k]), wherein P[k]=$\Sigma_{i=1}^{M} 2^{L-L_i} Q_i$[k], wherein P[k+1] comprises the probability of the symbol, L comprises a number of bits to represent scaled probabilities, $\{L_i\}_{i=1}^{M}$ comprises a maximum numbers of bits needed for the representation of the estimator functions.

6. The method of claim 5, further comprising computing $Q_1[k]=P[k]-\Sigma_{i=2}^{M} 2^{L-L_i} Q_i[k]$ only when $Q_1$ needs to be updated.

7. The method of claim 1, wherein calculating the probability comprises calculating the probability without performing multiplication operations.

8. The method of claim 1, wherein binary arithmetic coding the symbol comprises binary arithmetic encoding the symbol, comprising:

determining whether a value of the symbol has the particular value; and generating data representative of whether the value of the symbol has the particular value using the probability.

9. The method of claim 1, wherein binary arithmetic coding the symbol comprises binary arithmetic decoding the symbol, comprising:

receiving data representative of whether a value of the symbol has the particular value; and determining the value of the symbol according to the received data using the probability.

10. The method of claim 1, wherein the symbol comprises a bin of a syntax element of video data.

11. The method of claim 10, further comprising decoding the video data using the syntax element, comprising:

forming one or more prediction blocks;

decoding transform coefficients;

inverse transforming the transformation coefficients to form one or more residual blocks; and combining residual samples of the residual blocks with prediction samples of the prediction blocks to decode blocks of pictures of the video data, wherein the syntax element represents one of a prediction mode, one of the transformation coefficients, or partitioning information for partitioning the pictures into the blocks.

12. The method of claim 10, further comprising encoding the video data using the syntax element, comprising:

forming one or more prediction blocks;

subtracting the prediction blocks from uncoded blocks to produce residual blocks;

transforming residual samples of the residual blocks to form transformation coefficients; and encoding the transform coefficients, wherein the syntax element represents one of a prediction mode, one of the transformation coefficients, or partitioning information for partitioning the pictures into the blocks.

13. A device for coding data, the device comprising:

a memory configured to store data; and a processor implemented in circuitry and configured to:

calculate a plurality of estimator functions to generate a respective plurality of outputs to be used to calculate a probability of a symbol having a particular value based on a prior value of the symbol, wherein the symbol is to be binary arithmetic coded according to the probability, and wherein to calculate the estimator functions, the processor does not perform division operations; wherein to calculate the plurality of estimator functions, the processor is configured to use a plurality of weights and a plurality of shift parameters, wherein the processor is configured to calculate, for the prior value of the symbol being non-zero, a first of the estimator functions, the processor being further configured to subtract, from a prior output of the first of the estimator functions, a value based on the prior output of the first of the estimator functions shifted by a first of the shift parameters, and add a value based on a first of the weights shifted by the first shift parameter and wherein the processor is configured to calculate, for the prior value of the symbol being non-zero, a second of the estimator functions, the processor being further configured to subtract, from a prior output of the second of the estimator functions, a value based on the prior output of the second of the estimator functions shifted by a second of the shift parameters, and add a value based on a second of the weights shifted by the second shift parameter, wherein the first of the shift parameters is different from the second of the shift parameters and the first of the weights is different from the second of the weights;

calculate the probability of the symbol having the particular value, wherein to calculate the probability, the processor is configured to:

calculate a sum of the outputs of the estimator functions as the probability; and binary arithmetic code the symbol according to the probability of the symbol having the particular value.

14. The device of claim 13, wherein the processor is configured to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases},$$

$$P[k+1] = \sum_{i=1}^{M} Q_i[k+1]$$

wherein k+1 represents a coding order of the symbol, $\{W_1, \ldots, W_M\}$ comprises the weights, and $\{Q_1[k+1], \ldots Q_M[k+1]\}$ comprises the estimator functions, P[k+1] comprises the probability of the symbol, $\{S_1, \ldots S_M\}$ comprise the shift parameters, b[k] represents the prior value of the symbol, and wherein to calculate the estimator functions the processor is further configured to perform right-shift operations using the shift parameters instead of division operations.

15. The device of claim 13, wherein the processor is configured to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases},$$

$$P[k+1] = \sum_{i=1}^{M} 2^{L-L_i} Q_i[k+1]$$

wherein k+1 represents a coding order of the symbol, $\{W_1, \ldots, W_M\}$ comprises the weights, $\{S_1, \ldots S_M\}$ comprise shift parameters, P[k+1] comprises the probability of the symbol, $\{Q_1[k+1], \ldots, Q_M[k+1]\}$ comprises the estimator functions, L comprises a number of bits to represent scaled probabilities, $\{L_i\}_{i=1}^{M}$ comprises a maximum numbers of bits needed for the representation of the estimator functions, b[k] represents the prior value of the symbol, and wherein to calculate, the estimator functions the processor is further configured to perform right-shift operations using the shift parameters instead of division operations.

16. The device of claim 13, wherein the processor is configured to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{2^{L-1} - Q_1[k]}{2^{S_1}} \right\rfloor, & b[k] = 1 \end{cases}$$

$$Q_2[k+1] = \begin{cases} Q_2[k] - \left\lfloor \frac{Q_2[k]}{2^{S_2}} \right\rfloor, & b[k] = 0 \\ Q_2[k] + \left\lfloor \frac{2^{L-1} - Q_2[k]}{2^{S_2}} \right\rfloor, & b[k] = 1 \end{cases},$$

$$P[k+1] = Q_1[k+1] + Q_2[k+1]$$

wherein k+1 represents a coding order of the symbol, L comprises a number of bits, $2^{L-1}$ comprises the weights, $\{S_1, S_2\}$ comprise shift parameters, $\{Q_1[k+1], Q_2[k+1]\}$ comprises the estimator functions, P[k+1] comprises the probability of the symbol, b[k] represents the prior value of the symbol, and wherein to calculate, the estimator functions the processor is further configured to perform right-shift operations using the shift parameters instead of division operations.

17. The device of claim 13, wherein the processor is further configured to maintain a plurality of state elements $Q_1$ to $Q_M$ for a finite state machine used to calculate the probability as the tuple $(P[k], Q_1[k], \ldots, Q_M[k])$, wherein $P[k] = \sum_{i=1}^{M} 2^{L-L_i} Q_i[k]$, wherein P[k+1] comprises the probability of the symbol, L comprises a number of bits to represent scaled probabilities, $\{L_i\}_{i=1}^{M}$ comprises a maximum numbers of bits needed for the representation of the estimator functions.

18. The device of claim 17, wherein the processor is further configured to compute $Q_1[k] = P[k] - \sum_{i=2}^{M} 2^{L-L_i} Q_i[k]$ only when $Q_1$ needs to be updated.

19. The device of claim 13, wherein the processor is further configured to calculate the probability without performing multiplication operations.

20. The device of claim 13, wherein the processor is configured to binary arithmetic encode the symbol, and to binary arithmetic encode the symbol, the processor is configured to:
  determine whether a value of the symbol has the particular value; and
  generate data representative of whether the value of the symbol has the particular value using the probability.

21. The device of claim 13, wherein the processor is configured to binary arithmetic decode the symbol, and to binary arithmetic decode the symbol, the processor is configured to:
  receive data representative of whether a value of the symbol has the particular value; and
  determine the value of the symbol according to the received data using the probability.

22. The device of claim 13, wherein the symbol comprises a bin of a syntax element of video data.

23. The device of claim 22, further comprising a display configured to display decoded video data, and wherein the processor is further configured to decode the video data using the syntax element, wherein to decode the video data, the processor is configured to:
  form one or more prediction blocks;
  decode transform coefficients;
  inverse transform the transformation coefficients to form one or more residual blocks; and
  combine residual samples of the residual blocks with prediction samples of the prediction blocks to decode blocks of pictures of the video data, wherein the syntax element represents one of a prediction mode, one of the transformation coefficients, or partitioning information for partitioning the pictures into the blocks.

24. The device of claim 13, further comprising a camera configured to capture video data, and wherein the processor is further configured to encode the video data using the syntax element, wherein to decode the video data, the processor is configured to:
form one or more prediction blocks;
subtract the prediction blocks from uncoded blocks to produce residual blocks;
transform residual samples of the residual blocks to form transformation coefficients; and
encode the transform coefficients,
wherein the syntax element represents one of a prediction mode, one of the transformation coefficients, or partitioning information for partitioning the pictures into the blocks.

25. The device of claim 13, wherein the device comprises one or more of a camera, a computer, a mobile device, a broadcast receiver device, or a set-top box.

26. The device of claim 13, wherein the device comprises at least one of:
an integrated circuit;
a microprocessor; or
a wireless communication device that includes the one or more means.

27. A non-transitory computer-readable storage medium having stored thereon instructions that, when executed, cause a processor to:
calculate a plurality of estimator functions to generate a respective plurality of outputs to be used to calculate a probability of a symbol having a particular value based on a prior value of the symbol, wherein the symbol is to be binary arithmetic coded according to the probability, and wherein to calculate the estimator functions does not include division operations,
wherein to calculate the plurality of estimator functions the processor is caused to use a plurality of weights and a plurality of shift parameters,
wherein the processor is caused to calculate, for the prior value of the symbol being non-zero, a first of the estimator functions, the processor being further caused to subtract, from a prior output of the first of the estimator functions, a value based on the prior output of the first of the estimator functions shifted by a first of the shift parameters, and add a value based on a first of the weights shifted by the first shift parameter and
wherein the processor is caused to calculate, for the prior value of the symbol being non-zero, a second of the estimator functions, the processor being further caused to subtract, from a prior output of the second of the estimator functions, a value based on the prior output of the second of the estimator functions shifted by a second of the shift parameters, and add a value based on a second of the weights shifted by the second shift parameter,
wherein the first of the shift parameters is different from the second of the shift parameters and the first of the weights is different from the second of the weights;
calculate the probability of the symbol having the particular value, comprising instructions that cause the processor to:
calculate a sum of the outputs of the estimator functions as the probability; and binary arithmetic code the symbol according to the probability of the symbol having the particular value.

28. The non-transitory computer-readable storage medium of claim 27, wherein the instructions that cause the processor to calculate the probability comprise instructions that cause the processor to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases}$$

$$P[k+1] = \sum_{i=1}^{M} Q_i[k+1]$$

wherein k+1 represents a coding order of the symbol, $\{W_1, \ldots, W_M\}$ comprises the weights, and $\{Q_1[k+1], \ldots Q_M[k+1]\}$ comprises the estimator functions, P[k+1] comprises the probability of the symbol, $\{S_1, \ldots S_M\}$ comprise the shift parameters, b[k] represents the prior value of the symbol, and wherein to calculate the estimator functions the processor is further caused to perform right-shift operations using the shift parameters instead of division operations.

29. The non-transitory computer-readable storage medium of claim 27, wherein the instructions that cause the processor to calculate the probability comprise instructions that cause the processor to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{W_1 - Q_1[k]}{2^{S_1}} \right\rfloor, & b[k] = 1 \end{cases}$$

$$\vdots$$

$$Q_M[k+1] = \begin{cases} Q_M[k] - \left\lfloor \frac{Q_M[k]}{2^{S_M}} \right\rfloor, & b[k] = 0 \\ Q_M[k] + \left\lfloor \frac{W_M - Q_M[k]}{2^{S_M}} \right\rfloor, & b[k] = 1 \end{cases}$$

$$P[k+1] = \sum_{i=1}^{M} 2^{L-L_i} Q_i[k+1]$$

wherein k+1 represents a coding order of the symbol, $\{W_1, \ldots, W_M\}$ comprises the weights, $\{S_1, \ldots S_M\}$ comprise shift parameters, P[k+1] comprises the probability of the symbol, $\{Q_1[k+1], \ldots, Q_M[k+1]\}$ comprises the estimator functions, L comprises a number of bits to represent scaled probabilities, $\{L_1\}_{i=1}^{M}$ comprises a maximum numbers of bits needed for the representation of the estimator functions, b[k] represents the prior value of the symbol, and wherein to calculate, the estimator functions the processor is further caused to perform right-shift operations using the shift parameters instead of division operations.

30. The non-transitory computer-readable storage medium of claim 27, wherein the instructions that cause the processor to calculate the probability comprise instructions that cause the processor to calculate the probability according to:

$$Q_1[k+1] = \begin{cases} Q_1[k] - \left\lfloor \frac{Q_1[k]}{2^{S_1}} \right\rfloor, & b[k] = 0 \\ Q_1[k] + \left\lfloor \frac{2^{L-1} - Q_1[k]}{2^{S_1}} \right\rfloor, & b[k] = 1 \end{cases}$$

$$Q_2[k+1] = \begin{cases} Q_2[k] - \left\lfloor \frac{Q_2[k]}{2^{S_2}} \right\rfloor, & b[k] = 0 \\ Q_2[k] + \left\lfloor \frac{2^{L-1} - Q_2[k]}{2^{S_2}} \right\rfloor, & b[k] = 1 \end{cases},$$

$$P[k+1] = Q_1[k+1] + Q_2[k+1]$$

wherein k+1 represents a coding order of the symbol, L comprises a number of bits, $2^{L-1}$ comprises the weights, $\{S_1, S_2\}$ comprise shift parameters, $\{Q_1[k+1], Q_2[k+1]\}$ comprises the estimator functions, P[k+1] comprises the probability of the symbol, b[k] represents the prior value of the symbol, and wherein to calculate, the estimator functions the processor is further caused to perform right-shift operations using the shift parameters instead of division operations.

31. The non-transitory computer-readable storage medium of claim 27, further comprising instructions that cause the processor to maintain a plurality of state elements $Q_1$ to $Q_M$ for a finite state machine used to calculate the probability as the tuple (P[k], $Q_1[k]$, ..., $Q_M[k]$), wherein $P[k] = \Sigma_{i=1}^{M} 2^{L-L_i} Q_i[k]$, wherein P[k+1] comprises the probability of the symbol, L comprises a number of bits to represent scaled probabilities, $\{L_i\}_{i=1}^{M}$ comprises a maximum numbers of bits needed for the representation of the estimator functions.

32. The non-transitory computer-readable storage medium of claim 27, wherein the instructions that cause the processor to calculate the probability comprise instructions that cause the processor to calculate the probability without performing multiplication operations.

33. The non-transitory computer-readable storage medium of claim 27, wherein the symbol comprises a bin of a syntax element of video data.

* * * * *